United States Patent Office 3,541,132
Patented Nov. 17, 1970

3,541,132
PREPARATION OF α-AMINONITRILES
Richard N. Knowles, Hockessin, Del., assignor to E. I. du Pont de Nemours and Company, Wilmington, Del., a corporation of Delaware
No Drawing. Filed Aug. 6, 1968, Ser. No. 750,470
Int. Cl. C07c 121/42, 121/46
U.S. Cl. 260—465.5                 8 Claims

ABSTRACT OF THE DISCLOSURE

Water-immiscible α-aminonitriles, such as 2-amino-2,4-dimethylpentanonitrile, are prepared in a one-step synthesis in good yield by reacting a stoichiometric amount of the corresponding water-immiscible ketone, such as 4-methyl-2-pentanone, with a stoichiometric amount of hydrogen cyanide and an excess of ammonia, in the absence of a solvent, at temperatures of about 20 to 60° C., and at pressures above atmospheric. This process permits for good separation of impurities from the product and results in an aminonitrile having very good color.

BACKGROUND OF THE INVENTION

This application relates to an improvement in the preparation of aminonitriles, and more particularly is directed to an improvement in the preparation of water-immiscible α-aminonitriles from the corresponding water-immiscible ketone, hydrogen cyanide and ammonia, the improvement comprising carrying out the reaction in a solvent-free system, in the presence of excess ammonia, and in the absence of any excess hydrogen cyanide.

The preparation of aminonitriles from aldehydes or ketones is well known to the art. Gulewitsch first prepared 2 - amino - 2,4-dimethylpentanonitrile using 4-methyl-2-pentanone, ammonium cyanide and excess ammonia. See Ber. 39, 1192 (1906). However the reaction was carried out in an aqueous system and achieved yields of less than 65%. A 40% aqueous solution of formaldehyde has been converted to a water soluble nitrile under similar conditions in high yields, German Pat. No. 659,193. Other aldehydes such as β-methylmercaptopropionaldehyde have been reacted with excess hydrogen cyanide in the presence of excess ammonia and the absence of a solvent to obtain the corresponding nitrile, U.S. Pat. No. 3,131,210. However, such a procedure has never been applied to water-immiscible ketones such as those contemplated in this application.

I have discovered that the single step reaction of water-immiscible ketones of this invention with hydrogen cyanide and ammonia in the absence of a solvent, with no excess cyanide, and with excess ammonia, results in outstanding yields of the corresponding aminonitriles. Moreover, such a reaction provides a low-cost nitrile product of such high purity that with only decantation and air treatment to remove $NH_3$, it can be used as-is in subsequent reactions.

SUMMARY OF THE INVENTION

In summary, this invention is directed to an improvement in the process of preparing water-immiscible α-aminonitriles of the formula (1) 

wherein $R_1$ is hydrogen; and
$R_2$ is 2-methylpropyl, or 2-methoxy-2-methylpropyl;

with the proviso that $R_1$ and $R_2$ can be joined to form a six-membered ring; by reacting a water-immiscible ketone selected from among 4-methyl-2-pentanone, 4-methoxy-4-methyl-2-pentanone, and cyclohexanone, with hydrogen cyanide and ammonia at a temperature of 20 to 60° C. and an elevated pressure, the improvement comprising carrying out the reaction in a solvent-free system in which the molar ratio of ketone to hydrogen cyanide is about 1:1 and the molar ratio of ketone to ammonia is from about 1:1.2 to about 1:3.0.

This process results in extremely good yields of α-aminonitriles which are quite pure and surprisingly free of color. As a result, after excess ammonia is removed, these nitriles can be used without further purification in the preparation of the corresponding azo compounds as disclosed in copending application Ser. No. 644,097, filed June 7, 1967.

DESCRIPTION OF THE INVENTION

Reactants.—In the process of this invention, suitable reactants include the water-immiscible ketones 4-methyl-2-pentanone, 4-methyl-4-methoxy-2-pentanone, and cyclohexanone. These ketones can be obtained commercially having suitable purity for use in this invention.

The other reactants are anhydrous ammonia and hydrogen cyanide which can also be obtained commercially or can be prepared by methods well known to the art.

The degree of purity of the above reactants is not critical, however, it is desirable to exclude appreciable amounts of any impurity because of detrimental effects on overall yield and contamination of the end product. It is particularly desirable to avoid adding any significant amounts of water to the reaction either as a solvent or as an impurity in any of the raw materials. Water tends to reverse aminonitrile formation and causes solubility problems in the oxidation of the product aminonitrile to the corresponding azo compound. The presence of water or other solvents or diluents also decreases the amount of product that can be made in a given reactor volume by physically decreasing the quantity of reactants that can be charged.

Reaction conditions.—The process of this invention is ordinarily carried out in a closed vessel at an elevated pressure, ordinarily between about 10 and 250 p.s.i.g. However, pressures down to atmospheric or greater than 250 p.s.i.g. can be used if desired with little or no adverse effect on the product. For reasons of convenience and economy it is preferred to operate at a pressure of from about 20 to 220 p.s.i.g., and most preferably at a pressure of from about 40 to 60 p.s.i.g.

The temperature at which the process of this invention is carried out ordinarily ranges from about 20 to 60° C. It is preferred, however, to maintain the temperature between about 40 and 50° C.

The process is ordinarily carried to completion in about 3 to 10 hours, and is preferably run for from 4 to 7 hours.

The ratio of reactants used is extremely important to the successful operation of the process of this invention. The ketone and hydrogen cyanide will ordinarily be used in stoichiometric amounts and it is very desirable to avoid an excess of hydrogen cyanide. Excess hydrogen cyanide tends to polymerize, producing very darkly colored contaminants in the product. The amount of ammonia used will ordinarily range from about 20% to about 200% excess over stoichiometric. A preferred amount of ammonia is 100% excess over stoichiometric.

The hydrogen cyanide and ammonia can be added to the ketone in a suitable reaction vessel in either order. When a stirred autoclave is used as the reaction vessel, it is preferred to saturate the ketone with ammonia at 5 to 30° C., add the hydrogen cyanide at 5 to 30° C., and then feed the remaining ammonia to the vessel at temperatures up to 40-45° C. and pressures of 20 to 50 p.s.i.g.

The water-immiscible product can be recovered after the reaction by simply decanting off water produced during the reaction. The water contains a considerable proportion of any impurities present and the resultant product can be used as-is, in formation of azo compounds as disclosed in copending application Ser. No. 644,097, filed June 7, 1967.

This invention is further illustrated in the following examples wherein parts and percentages are by weight unless otherwise noted.

EXAMPLE 1

The preparation of 2-amino-2,4-dimethylpentanonitrile is carried out in a small stirred autoclave. The pressure vessel has internal dimensions of 3 1/16 inch diameter, by 5 3/4 inch height, and it is equipped with a cooling coil comprising nine 2 3/4 inch diameter turns of 1/4 inch stainless steel tubing; a thermocouple; a bottom drain and ammonia addition port; a top feed port; a vaned disk agitator 1 1/2 inch in diameter with eight 1/8 inch deep vanes; a rupture disk assembly; a pressure gauge; and an external electric mantle for heating. The reactor is charged with 250 parts of 4-methyl-2-pentanone, and then is cooled from 24° C. to 9° C. with water in the coil. The reaction vessel is sealed and evacuated to a pressure of 12 cm. Hg. Three parts of liquid ammonia are admitted from a cylinder through a check valve to the bottom of the vessel. The pressure is then vented, the reactor is opened, and 67 parts of liquid hydrogen cyanide are added to the reactor over a 16 minute period while maintaining water through the cooling coil. The temperature then rises to about 15° C., the reactor is again sealed, and addition of ammonia is begun as previously, but with no cooling. During the ammonia addition, heat is applied with the external mantle and after 12 minutes the temperature reaches 43° C., and the pressure rises to 30 p.s.i.g. A total of 38 parts of ammonia have been added at this point. Ammonia addition and heating are then continued for another 12 minutes, while the temperature rises to 51° C. and the pressure reaches 50 p.s.i.g. At this time a total of 58 parts of ammonia have been added. Another 10 parts of ammonia are added intermittently during the next 21 minutes at 50 p.s.i.g. and 50° C. Ammonia addition is continued in the same manner for another 3 hours and 30 minutes at a temperature of 50° C. such that the pressure remains at 50 p.s.i.g. The total ammonia added during the reaction at this time is 75 parts. The reaction mixture is then cooled and the pressure is released from the vessel. The reactor is drained and the water layer is separated by decantation. The organic layer contains 3.5% ammonia and 83.0% aminonitrile. Yield of 2-amino-2,4-dimethylpentanonitrile from 4-methyl-2-pentanone is 88.9% based on titratable aminonitrile content in the organic phase.

EXAMPLE 2

To the same reactor described in Example 1, 200 parts of 4-methyl-2-pentanone are charged and cooled from 26° C. to 10° C. The reactor is sealed and 2 parts of ammonia are admitted to the cooled ketone as in Example 1, but with no cooling. Temperature in the reactor rises to about 13° C. and the pressure rises to 6 p.s.i.g. The pressure is then vented, cooling with the coil is started, and 54 parts of liquid hydrogen cyanide are added over a period of 3 minutes. The temperature remains at 13° to 14° C. during the addition. The reactor is then resealed and the cooling is terminated. Then 25 parts of ammonia are added over a 7-minute period while the temperature rises to 40° C. and the pressure rises to 15 p.s.i.g. Heat is then supplied with the heating mantle while maintaining ammonia feed. After 7 minutes of continued ammonia addition and the application of heat with the mantle, the temperature in the reactor reaches 51° C. and the pressure reaches 35 p.s.i.g. Heating is then stopped, and ammonia addition is continued for another 11 minutes before the reactor pressure reaches 50 p.s.i.g. At this time 57 parts of ammonia have been added and the reaction temperature is 52° C. Continued intermittent ammonia addition for a period of 211 minutes at a reaction temperature of 50° C. and pressure of 50 p.s.i.g. results in the consumption of a total of 77 parts of ammonia. The reactor is then cooled and the pressure is released before draining. Approximately 300 parts of product are drained from the reactor and separated into 269.9 parts of organic phase and 22.1 parts of aqueous phase. The organic phase contains 3.09% ammonia and 85.0% 2-amino-2,4-dimethylpentanonitrile. The yield is 91.0%, based on the amount of ketone charged to the reaction.

The products 1-amino-1-cyanocyclohexane and 2-amino-4-methoxy-2,4-dimethylpentanonitrile are prepared by the procedure of Example 2 when equivalent molar amounts of cyclohexanone and 4-methyl-4-methoxy-2-pentanone are substituted for the 4-methyl-2-pentanone of Example 2.

EXAMPLE 3

A 1-liter stainless steel bomb is charged with 300 parts of 4-methyl-2-pentanone and then is cooled in an acetone-Dry Ice bath. Eighty-one parts of hydrogen cyanide are then added and the bomb is closed. One hundred and two parts of ammonia are then added through a valve on the top of the bomb from a weighed ammonia cylinder. The bomb is fitted with a thermocouple and pressure gauge and then is sealed. The sealed bomb is heated to a temperature of 40° C.±3° C. for 7 hours under autogenous pressure. During the first hour the pressure reaches a maximum of 70 pounds per square inch, and then drops to 40 pounds as the reaction progresses. At the end of the reaction the bomb is cooled to room temperature and the residual pressure is released in a vented hood. The contents of the bomb are transferred to a separatory funnel and the darkly colored, lower aqueous phase is separated. Four-hundred and seven and three-tenths parts of light yellow organic phase is recovered and analyzed. It contains 2.1% ammonia, 88.9% 2-amino-2,4-dimethylvaleronitrile, 0.6% hydrogen cyanide, and 6.2% water; the remainder is 4-methyl-2-pentanone. The yield of 2-amino-2,4-dimethylvaleronitrile is 95.5%.

This 2-amino-2,4-dimethylpentanonitrile solution is stable for several days at room temperature or for an extended period when stored under refrigeration.

This 2-amino-2,4-dimethylpentanonitrile solution is to be oxidized to azo-bis-2,4-dimethylpentanonitrile in 85-90% yield. First the ammonia concentration is lowered to less than 0.1% by passing through the solution about 1 liter of nitrogen or air per 100 grams of solution at room temperature. This operation is performed in less than an hour and the resulting 2-amino-2,4-dimethylpentanonitrile solution is used promptly in the process disclosed in copending application Ser. No. 644,097 filed June 7, 1967.

I claim:

1. In the process for preparing water-immiscible α-aminonitriles by reacting a water-immiscible ketone selected from the group consisting of 4-methyl-2-pentanone, 4-methoxy-4-methyl-2-pentanone and cyclohexanone, with hydrogen cyanide and ammonia at a temperature of 20 to 60° C. and an elevated pressure, to produce a nitrile selected from the group consisting of 2-amino-2,4-dimethylpentanonitrile, 2-amino-4-methoxy-2,4-dimethylpentanonitrile and 1-amino-1-cyanocyclohexane, respectively, the improvement comprising carrying out the reaction in the absence of a solvent and the absence of excess hydrogen cyanide with a molar ratio of ketone to hydrogen cyanide of about 1:1 and a molar ratio of ketone to ammonia of from about 1:1.2 to about 1:3.0.

2. The process of claim 1 in which the ketone is 4-methyl-2-pentanone.

3. The process of claim 1 in which the temperature range is 40 to 50° C.

4. The process of claim 1 in which the pressure range is about 10 to 250 p.s.i.g.

5. The process of claim 1 in which the ratio of ketone to ammonia is 1:2.

6. The process of claim 5 in which the temperature range is 40 to 50° C. and the pressure range is 10 to 250 p.s.i.g.

7. The process of claim 6 in which the pressure range is 40 to 60 p.s.i.g.

8. The process of claim 6 in which the ketone is 4-methyl-2-pentanone.

References Cited

Zelinsky, et al., Ber. 1906 (vol. 39), p. 1728.
Herbst, et al., J.A.C.S., 54 (1932), pp. 2465–2466.
Sudo, et al., C.A., 58 (1963), p. 12433.

JOSEPH P. BRUST, Primary Examiner

U.S. Cl. X.R.

260—192, 464